INVENTOR
Lionel Roy Frank Harris
BY
Holcombe, Wetherill + Brisebois ATTORNEYS

March 1, 1960 L. R. F. HARRIS 2,927,161

PULSE DISTRIBUTION SYSTEMS

Filed Jan. 8, 1954 5 Sheets-Sheet 2

INVENTOR

Lionel Roy Frank Harris

BY

Holcombe, Wetherill & Brisebois ATTORNEYS

March 1, 1960 L. R. F. HARRIS 2,927,161

PULSE DISTRIBUTION SYSTEMS

Filed Jan. 8, 1954 5 Sheets-Sheet 3

INVENTOR
Lionel Roy Frank Harris

BY

Holcombe, Wetherill + Brisebois ATTORNEYS

March 1, 1960 L. R. F. HARRIS 2,927,161

PULSE DISTRIBUTION SYSTEMS

Filed Jan. 8, 1954 5 Sheets-Sheet 4

INVENTOR
Lionel Roy Frank Harris

BY
Holcombe, Wetherill & Brisebois ATTORNEYS

March 1, 1960 L. R. F. HARRIS 2,927,161

PULSE DISTRIBUTION SYSTEMS

Filed Jan. 8, 1954 5 Sheets-Sheet 5

INVENTOR
Lionel Roy Frank Harris

BY

Holcombe, Wetherill & Brisebois ATTORNEYS

United States Patent Office 2,927,161
Patented Mar. 1, 1960

2,927,161

PULSE DISTRIBUTION SYSTEMS

Lionel Roy Frank Harris, Kenton, England, assignor to Her Majesty's Postmaster General, London, England Application January 8, 1954, Serial No. 402,896
Claims priority, application Great Britain January 12, 1953
8 Claims. (Cl. 179—15)

This invention relates to pulse distribution systems in which pulse trains are required to operate in a plurality of electric circuits. In particular, but not exclusively it relates to pulse distribution systems for time-division multiplex communication systems in which each connection or circuit through the system uses a pulse train, the pulses of which do not overlap the pulses of any other pulse train used for any other connection through the system.

In this specification a succession of pulses on one lead equally spaced in time constitutes a pulse train. A group of pulse trains are said to be equally time spaced if the pulse repetition frequency is the same in all trains in the group and if all the pulses of all the trains in the group are evenly spaced in time. Two pulse trains are said to be coincident if the pulses of one train coincide in time with the pulses of the other train. Combinations of a plurality of pulse trains all appearing on one lead such that the time intervals between consecutive pulses appearing on the lead are not equal will not be included in the definition of a pulse train but will be referred to herein as a combination of pulse trains.

In one kind of time division multiplex communication system the channels of a group of transmit channels are connected to a common channel by associating each transmit channel with a transmit pulse modulator which connects its associated transmit channel to the common channel when pulsed by each pulse of a transmit channel pulse train. Similarly a group of receive channels is connected to a common channel by associating each receive channel with a receive pulse modulator which connects its associated receive channel to the common channel when pulsed by each pulse of a receive channel pulse train. It is clear that the group of transmit modulators and the group of receive modulators each require any one transmit or receive pulse train to be made operative or effective in only one modulator of the group.

In any such arrangement the group of transmit and receive modulators connecting transmit or receive channels to a common channel may be regarded as a group of electric circuits in each of which a pulse is effective only when applied as coincident pulses over at least two leads connected to the circuit.

The leads are connected to pulse train generators capable of providing predetermined combinations of pulse trains and the leads interconnecting the sources and the circuits are, in one embodiment of the invention connected to coincidence gate circuits which may form part of the former.

Figure 1:
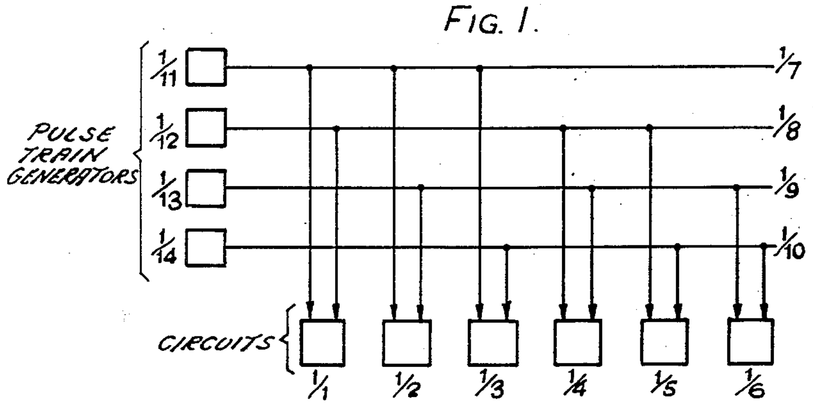
Figure 2:
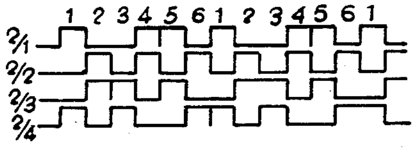
Figure 3:
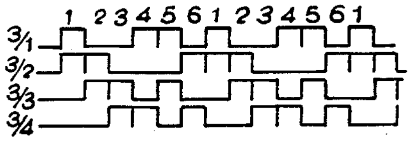
Figure 4:
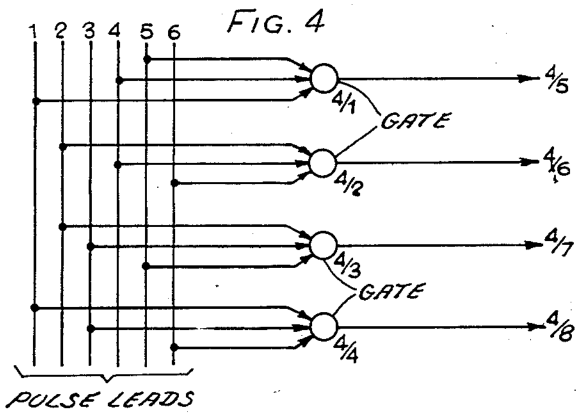
Figure 7:
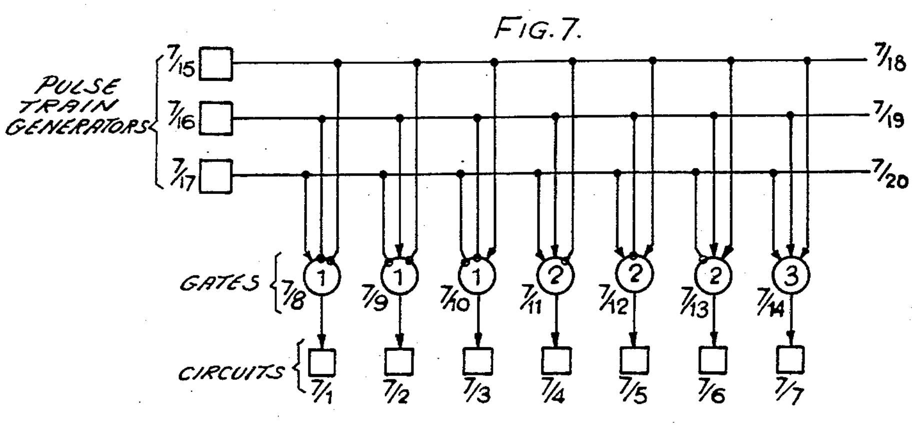
Figure 5:
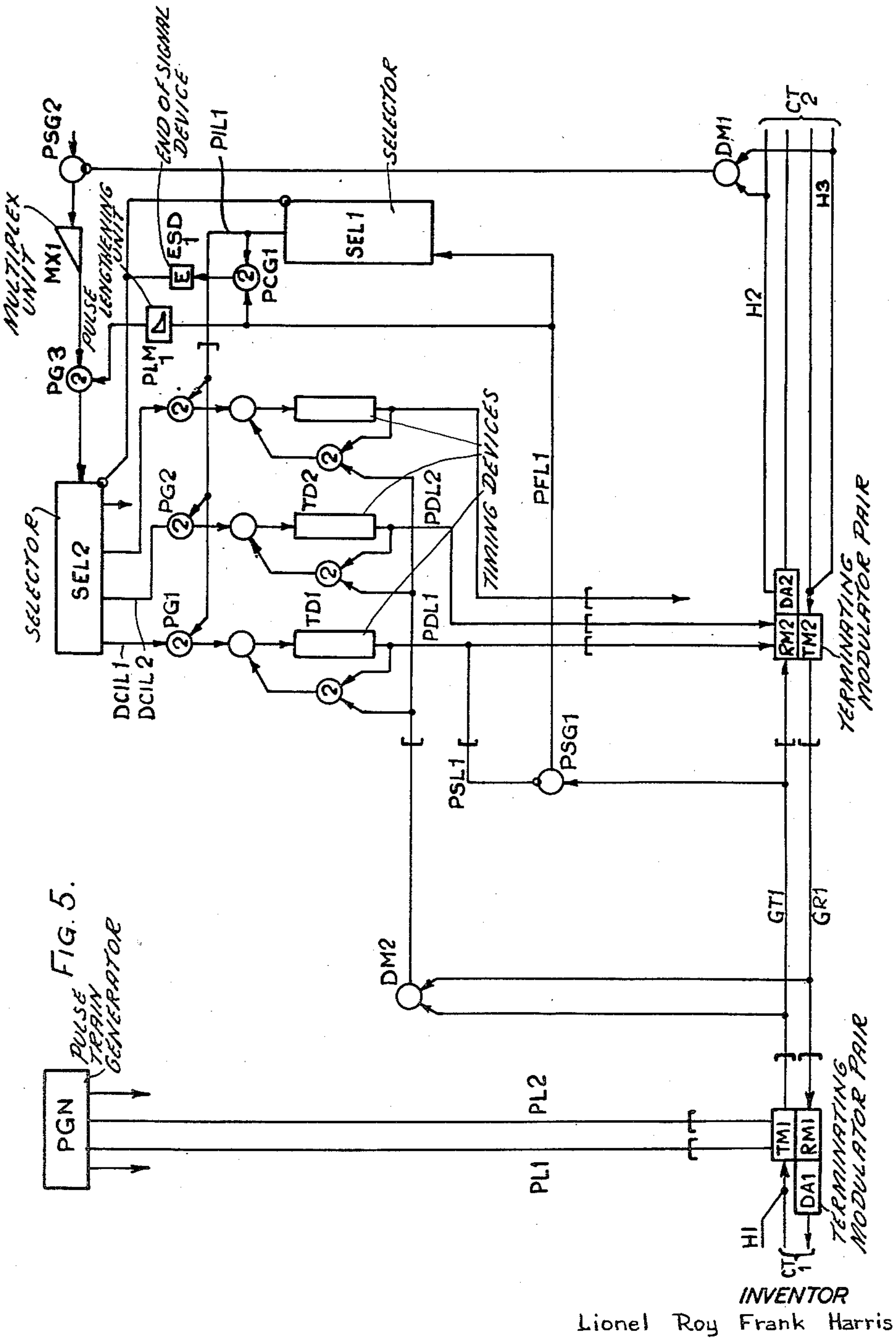
Figure 6:
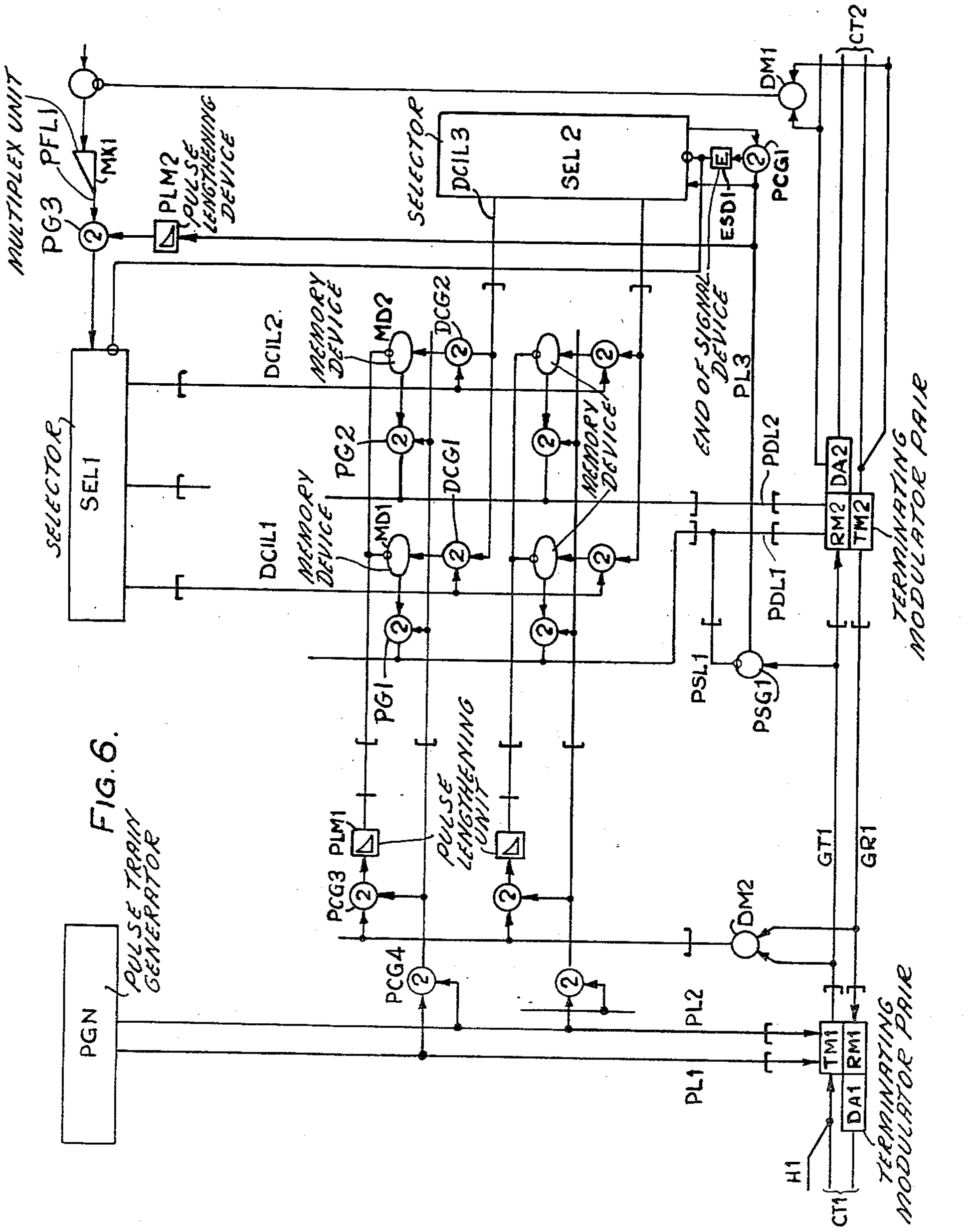
Figure 8:
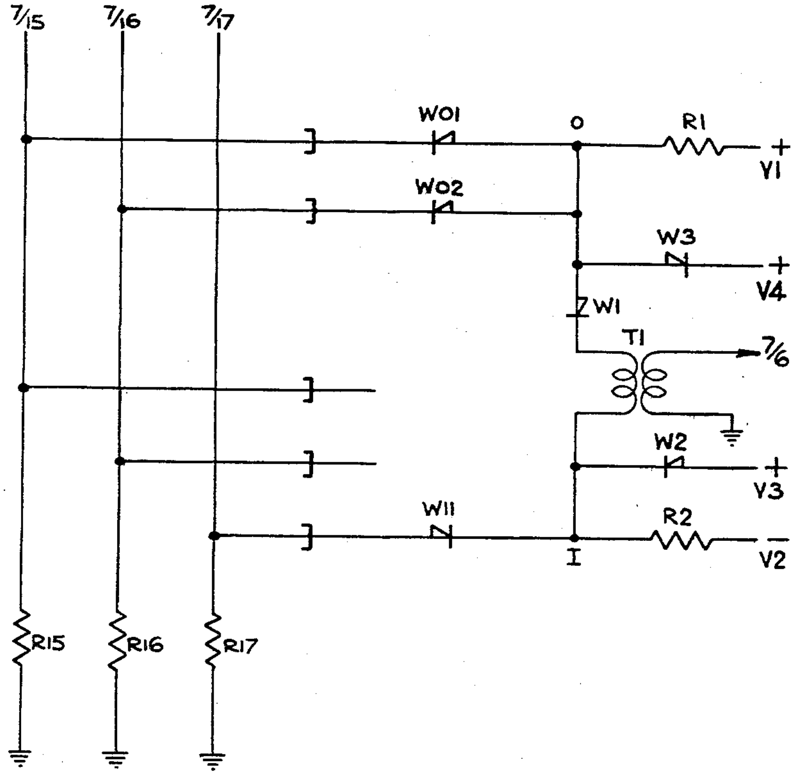

Examples of the invention will now be described in greater detail with reference to the accompanying drawings of which Fig. 1 is a block schematic of one embodiment of the method of deriving pulse trains, Figs. 2 and 3 are the waveforms of pulse trains appearing on certain leads of Fig. 4, Fig. 4 is a block schematic illustrating one method of combining pulse trains, Figs. 5 and 6 are block schematic diagrams of line finder switches incorporating pulse distributing systems according to the present invention, Fig. 7 is a block schematic of another method of deriving pulse trains, and Fig. 8 is a circuit diagram of a coincidence gate of Fig. 7.

A number $n$ leads may be used to distribute pulses to $2^n-1$ circuits since there are $2^n-1$ combinations for each of which a pulse must be applied on at least one lead to be effective in the associated circuit. Such an arrangement is shown in Fig. 7 in which the number of circuits is 7 and the number of leads is 3. Fig. 7 shows 7 circuits 7/1, 7/2 . . . 7/7 with associated pulse coincidence gates 7/8, 7/9 . . . 7/14 respectively to which pulse generators 7/15, 7/16 and 7/17 are connected via leads 7/18, 7/19 and 7/20 respectively. The outputs of the pulse coincidence gates 7/8 . . . 7/14 are applied to circuits 7/1 . . . 7/7 respectively but a coincidence gate will produce an output only if a predetermined combination of pulses is applied to it. Thus a pulse will be applied to circuit 7/1 if pulses are applied to gate 7/8 on 7/20 but not on 7/18 and 7/19; to circuit 7/2 if pulses are applied to gate 7/9 on 7/19 and not on 7/18 and 7/20; to circuit 7/3 if pulses are applied to gate 7/10 on 7/18 and not on 7/19 and 7/20; to circuit 7/4 if pulses are applied coincidentally to gate 7/11 on 7/19 and 7/20 and not on 7/18; to circuit 7/5 if pulses are applied coincidentally to gate 7/12 on 7/18 and 7/20 and not on 7/19; to 7/6 if pulses are applied coincidentally to gate 7/13 on 7/18 and 7/19 and not on 7/20 and to 7/7 if pulses are applied coincidentally to gate 7/14 on 7/18, 7/19 and 7/20. Thus for each circuit the pulse must appear on a combination of leads individual to the appropriate coincidence gate and the pulse generators may be controlled for example with mercury delay line circulating systems or like timing devices to generate the pulse trains on the appropriate pulse leads. With this method of pulse generation the gate circuits are different depending upon the number of leads on which the pulse must appear to be effective. Also, if all combinations are used, all the leads are connected to all the circuits of Fig. 7.

Fig. 8 shows one form which might be taken by the coincidence gates of the arrangement of Fig. 7. Gate 7/13 is shown by way of example and it comprises a resistor R1 connected between point O and positive voltage supply V1 and a resistor R2 connected between point I and negative voltage supply V2. Point O is connected via rectifier W3 to positive supply voltage V4 and via rectifier W1 in series with the winding of transformer T1 to the point I which is connected via rectifier W2 to a small positive supply voltage V3. The three pulse generators 7/15, 7/16 and 7/17 are connected by their pulse output leads to resistors R15, R16 and R17 respectively which are of low resistance and are connected to earth. Each pulse lead is connected to each gate by a rectifier. Those pulse leads used as operating stimuli to a gate are connected to the point O, and those used as inhibiting stimuli are connected to the point I. Thus for gate 7/13, point O is connected via W01 to R15 and via W02 to R16 and point I is connected via W11 to R17. The directions of the rectifiers are as shown in Fig. 8 and will be made clear by the following description of the circuit operation.

With no pulses from 7/15, 7/16 or 7/17 current flows from V1 via R1 to point O and from point O via W01 and R15 to earth. The potential of point O being thus held nearly at earth because R15 is of low value as explained above. Current also flows from V3 via W2 to point I and thence via R2—V2, the potential of V3 being such that W1 and W11 are both just held non-conducting point I being slightly above earth potential. With a positive pulse on 7/15, 7/16 either rectifier W01 or W02 will be "backed off" but the current to point O from V1 will be carried by the other and point O will not change in potential sufficiently to cause W1 to conduct. Only with a pulse on both 7/15 and 7/16 is point O allowed to rise until clamped to potential V4 by rectifier W3. Potential V4 is positive to earth by an amount just less than the minimum pulse voltage on the pulse leads. The rise in potential of point O will cause a current to flow in W1 and the primary of transformer T1 unless there is a pulse on 7/17 which via W11 backs off W2 and causes point I to rise substantially to the pulse voltage thus backing off W1. Thus only if all the rectifiers connected between the pulse leads and point O are backed off by coincident pulses can point O rise and current will then only flow in T1 if none of the pulse leads connected to I carry coincident pulses which would cause I to rise. Current in T1 will generate a pulse in the secondary which is applied to 7/6 in this case. Clearly several pulse leads may be connected to each of the O and I points of the coincidence gates.

An economy can be made if some combinations are not used. If for example in Fig. 7, 7/7 is deleted the inhibiting connections from 7/18, 7/19 and 7/20 to gates 7/11, 7/12 and 7/13 respectively may be removed resulting in a simplification of these gates. The gates may be further simplified if all the gates have the same number of leads connected to them on all of which the pulse is required to appear to be made effective. No inhibiting leads are then required.

Thus in one embodiment of the present invention a plurality of pulses may be distributed amongst a plurality of circuits by associating with each circuit or incorporating in each circuit a coincidence gate to which leads from the pulse train generators are connected such that only coincident pulses on all the leads applied to the gate produce an output and by arranging the leads so that each gate is associated with a unique combination of R leads from a set of S leads each connected to a pulse train generator where R is an integer and the same for all circuits in the group.

Such an arrangement is shown in Fig. 1 in which the number of circuits is 6 and the number of pulse generators is only 4. Fig. 1 shows that the 6 circuits 1/1, 1/2 . . . 1/6 are associated with combinations of the 4 leads 1/7, 1/8, 1/9 and 1/10 as follows; circuit 1/1 with combination 1/7 and 1/8; 1/2 with 1/7 and 1/9; 1/3 with 1/7 and 1/10; 1/4 with 1/8 and 1/9; 1/5 with 1/8 and 1/10, 1/6 with 1/9 and 1/10. Leads 1/7, 1/8, 1/9, 1/10 are associated with pulse train generators 1/11, 1/12, 1/13, 1/14, respectively and these are controlled to produce the pulses required to be effective in the circuits which they feed. In Fig. 1 each circuit includes a pulse coincidence gate which is not shown separately.

Using this method of pulse distribution the number of circuits which may be supplied with pulses from S pulse generators is the number of ways of taking S things R at a time and this is given by $$\frac{\underline{|S}}{\underline{|R}\cdot\ \underline{|S-R}}$$

In particular the method results in an economy of the timing devices which control the pulse generators over those required for systems of pulse distribution previously proposed in which pulse leads are each associated with a timing device capable of controlling the generation of any combination of pulse trains in a set of equally spaced pulse trains. For example, to supply a group of 400 circuits, each incorporating a coincidence gate to which two pulse leads are connected, using previously proposed methods of pulse distribution two groups of 20 timing devices, making a total of 40 would be required. According to the present invention only 29 timing devices are required these giving $$\frac{29\times 28}{2}=406 \text{ combinations}$$

For circuits to which three leads are connected, the previous methods would require three groups having 8, 8 and 7 timing devices in the groups and giving 448 combinations from 23 timing devices; according to the present invention, the 400 three pulse lead circuits require only 15 timing devices which give $$\frac{15\times 14\times 13}{2\times 3}=455 \text{ combinations}$$

One method of producing the combinations of pulse trains necessary to supply the coincidence gates required according to the present invention, is illustrated in Fig. 4. Leads 1 to 6 carry a set of equally time spaced pulse trains. The combining units 4/1, 4/2, 4/3, 4/4 each have three inputs which are connected to the leads 1 to 6 according to which pulses are required on the leads 4/5, 4/6, 4/7, 4/8 which carry the outputs from the combining units 4/1, 4/2, 4/3, 4/4. Fig. 2 shows combinations 2/1, 2/2, 2/3, 2/4 of the pulse trains 1 to 6 which appear on the leads 4/5, 4/6, 4/7, 4/8 when the combining unit input leads are connected as shown in Fig. 4. Pulse train 1 of Fig. 4 may be made to appear at the output of one coincidence gate of a number of coincidence gates each with two input leads by applying the combinations of pulse trains appearing on leads 4/5 and 4/8 to that circuit. These combinations of pulse trains are shown on 2/1 and 2/4 of Fig. 2. An alternative set of combinations of pulse trains shown in Fig. 3 is obtained by changing the pulse train inputs to combining units 4/6 and 4/8. In Fig. 3 combinations 3/1 . . . 3/4 correspond with combination 2/1 . . . 2/4 of Fig. 2. Using these and applying leads 4/5 and 4/8 to the coincidence gate would make the pulse train appearing on lead 4 of Fig. 4 appear on the output of that circuit.

The combinations of pulse trains may alternatively be generated by a combination of trigger devices operated from a source of equally-time-spaced pulses and arranged to deliver output pulses in the required combinations.

One application of the present invention is to a so-called linefinder switch. It is often required and is well known to those skilled in the art, to connect a calling circuit on one side of a switch to any one of a number of output circuits on the other side of the switch. Such a switch is shown in Fig. 5 and comprises a group of circuits each associated with a pair of transmit and receive modulators connected by a pair of common leads, one for each direction of transmission, to a second group of pairs of transmit and receive modulators, each pair being associated with a circuit on the output side of the switch. On the calling or input side of switch each circuit is associated with an individual pulse train, the channel pulse train whose pulse position is characteristic of the circuit, in a set of pulse trains used for connections through the switch. The circuit's associated pulse train is made effective in its pair of modulators by distributing pulses on a set of pulse leads using, for example, techniques herein disclosed. The circuits on the other side of the switch, which will be referred to as the output side of the switch, are each associated with a combination of timing devices, for example, delay line circulating systems used for distributing pulses to the modulators of the circuits and operating so that any pulse train may be made effective in any pair of modulators on the output side of the switch by causing coincident pulses to circulate in the delay line circulating systems associated with that pair of modulators.

Connections through the switch are established one at a time and it is necessary to make a selection of one of the circuits which are calling for connection and one of the free circuits on the other side of the switch. These selections may be made using techniques disclosed in the specification of co-pending patent application No. 224,874, filed on May 7, 1951, in the names of Thomas Harold Flowers et al.

When a connection is established through the switch there is a speech path between the calling input circuit and the called output circuit and in addition a holding path which maintains the connection so long as a signal is applied to the hold leads of either the calling or called circuit.

The operation of the switch will be described considering the selected calling input circuit CT1 and the selected output circuit CT2 to be those shown in Figure 5. When the associated circuit calls a continuous signal appears on hold lead H1 opening the transmit modulator TM1 which is supplied with fixed coincident pulse trains from the pulse generator PGN over leads PL1 and PL2 which are also connected to the receive modulator RM1. The characteristic channel pulse train of the calling circuit appears on the common pulse lead GT1 which is connected to the inhibiting gate circuit PSG1. The pulse trains of all busy circuits appear on inhibiting lead PSL1 which is commoned to the outputs of all the delay line circulating systems so that only pulse trains from calling circuits not yet connected appear on lead PFL1 which is connected to calling circuit selecting means Sel.1. The pulse train associated with the selected calling circuit appears on lead PIL1 and is applied to a number of gates of which PG1, PG2 and one other are shown. PG1 and PG2 are connected to the delay line timing device TD1 and TD2 respectively comprising the combination of timing devices used to distribute pulse trains to the modulators of CT2. Devices TD1 and TD2 are also connected to the modulators of circuits other than CT2, but CT2 is the only circuit to which both TD1 and TD2 are connected. Busy circuits on the output side of the switch have a hold signal on one or both of their hold leads and indicate this condition through decoupling means such as DM1 to suppression gate circuits such as PSG2 so that time-spaced pulse trains appearing from multiplex MX1 represent free circuits on the output side of the switch. A pulse lengthened output of PLM1 from lead PFL1 on which appear only the pulses of calling circuits not yet connected to output circuits is applied to coincidence gate PG3 allowing the pulse trains of the free output circuits to pass into selecting means Sel.2, which selects one of the free output circuits and D.C. marks the delay line circulating systems associated with the selected output circuit over leads such as DCIL1 and DCIL2 (if CT2 is the related circuit) so opening the gates PG1 and PG2 and allowing the pulse train of the selected calling circuit to pass from PIL1 into delay lines TD1 and TD2 where it continues to circulate so long as this pulse is present on either of the common leads GT1 or GR1. The pulse train used in a connection continues to appear on the common leads so long as hold signals are applied to the switch. The pulse train of the selected calling circuit is now now passed over leads PDL1 and PDL2 as coincident pulses to send and receive modulators TM2 and RM2 associated with the selected output circuit CT2 and according to the present invention it is only in these modulators that the selected pulse of the calling circuit is effective. The connection between the calling circuit on the input side of the switch and the selected circuit on the output side of the switch is now complete.

It now remains to release the selecting apparatus Sel.1 and Sel.2 so that it may be used to establish further connections. The release is started by the suppression of the selected calling circuits pulse train on lead PFL1 by the appearance of this pulse train on lead PSL1. Coincidence gate PCG1, which has the selected calling circuit's pulse applied from lead PFL1 and over lead PIL1 from the selecting device Sel.1, ceases to give an output to the end of signal device ESD1 whereupon the signal generated by ESD1 inhibits both selecting means Sel.1 and Sel.2. The selected output circuit indicates a busy condition to the multiplex MX1 from hold leads H2 and H3 through decoupling means DM1, thus preventing the selected output circuit being used again while the connection is still established, for which period the storage of the selected calling circuit's pulse train in the selected called circuits combination of timing devices is maintained by the application of the pluse train on the common lead pair to said timing devices via decoupling means DM2.

A further application of the present invention is to a switch similar to that just described but using static memory devices in place of the timing devices. The static memory devices are arranged in groups, each group corresponding to a delay line circulating system in the previous embodiment and each static memory device in a group corresponding to a pulse position in the said delay line circulating systems.

The switch to be described is shown in Fig. 6 and comprises a group of transmit and receive modulators associated with circuits on the input side of the switch one circuit CT1 and its transmit and receive modulators TM1 and RM1, respectively, being shown connected by two common leads GT1 and GR1 to a second group of pairs of transmit and receive modulators associated with circuits such as circuit CT2 and transmit and receive modulators TM2 and RM2 respectively on the output side of the switch. The transmit modulators of one group are connected by one of the common leads to the receive modulators of the other group in order to provide transmission in each direction. The modulators on the input side are connected to a pulse train generator PGN by a number of leads so that each modulator pair has connected to it a fixed pair of leads carrying coincident pulse trains in accordance with the present invention. In this manner each pair of transmit and receive modulators associated with a particular circuit on the input side of the switch is allocated a characteristic pulse train. The transmit and receiver modulators in the output group are connected in pairs to groups of static memory devices so that each pair of transmit and receive modulators is associated with two groups of static memory devices.

It is arranged that there is a static memory device in each group of static memory devices associated with each of the characteristic pulse trains of the circuits connected to the input group of modulators. The switch includes means for marking two groups of memory devices. Sel. 1 which selects a free output circuit marks two leads such as DCIL1 and DCIL2. The memory devices in the selected groups are operated and cause coincident pulse trains corresponding to the pulse train of the calling circuit on the input side to which connection is to be made, to appear on two leads connected to the modulator pair associated with the selected circuit on the outgoing side of the switch. Means is also provided for releasing the operated memory devices when the connection is no longer required as indicated by the removal of holding signals from both calling and called circuit which causes the disapperance of the characteristic pulse of the input circuit from common leads GT1 and GR1. A means of indicating free circuits on the output side of the switch is provided and consists of a multiplex MX1 which produces time spaced trains of marking pulses associated with free circuits, thus indicating to the selecting means Sel.1 the combination of groups of memory devices associated with the output modulator pair of the selected outgoing circuit.

In order to make the operation of the selecting means clearer the process will be described with reference to Fig. 6 and assuming that the selected circuit CT2 on the output side of the switch and the calling circuit CT1 on the input side of the switch are those shown in the diagram. When the circuit on the input side of the switch calls, the characteristic channel pulse train of this circuit supplied to the modulator TM1 over leads PL1 and PL2 as coincident pulse trains, appears on the common lead GT1. The pulse train on the common lead passes through the decoupling means DM2 to coincidence gates such as PCG3 which have the characteristic pulse trains of the circuits on the input side of the switch applied to their other input. The output of the coincidence gate PCG3 is applied to pulse lengthening unit PLM1 connected to the memory devices MD1 and MD2 which are associated with the coincident pulse trains applied to coincidence gate PCG4. The signal from the pulse lengthening unit PLM1 removes an inhibition from the memory devices MD1 and MD2. At the same time the pulse trains on common lead GT1 are applied to the inhibition gate PSG1 which is closed to the pulses of busy circuits, because some of the memory devices associated with them are operated, causing the pulses of these busy circuits to appear on inhibiting lead PSL1 which is common to the outputs of all the memory devices. The pulse train of the calling circuit from modulator TM1 does not appear on PSL1 and is not suppressed in inhibition gate PSG1 and passes over lead PL3 to the selecting means Sel.2 which having selected this pulse train D.C. marks on a lead such as DCIL3 the memory devices in each group of memory devices which are associated with the selected pulse train, by applying a signal to coincidence gates DCG1 and DCG2.

Having marked the memory devices in all the groups of memory devices which are associated with the pulse train of the calling circuit on the input side of the switch, it now remains to mark the groups of memory devices i.e. the timing devices which are associated with the modulator pair of a free circuit on the output side of the switch. Time spaced marking pulse trains whose time-positions indicate free circuits on the output side of the switch appear on lead PFL1 from multiplex MX1 and are applied to coincidence gate PG3 on whose other input appears the pulse lengthened output of PLM2 from lead PL3 indicating that a selection is necessary. Selecting means Sel.1 then selects the indicating pulse train of one of the free output circuits and D.C. indicates on leads such as DCIL1 and DCIL2 to the groups of memory devices associated with the modulator pair of the selected output circuit. This provides a second input to coincidence gates DCG1 and DCG2 and causes memory devices MD1 and MD2 to be operated to connect a second input to coincidence gates PG1 and PG2, and so apply the pulse train of the calling circuit on the input side of the switch to the modulator pair TM2 and RM2 of the selected circuit on the output side of the switch, as coincident pulse trains over lead PDL1 and PDL2. The connection is now established and the selecting apparatus must be released as described in the previous embodiment.

Each of the static memory devices MD1, MD2 may include, for example, a cold cathode thyratron. In that case the removal of the inhibition by pulse lengthening unit PLM1 allows HT to be applied to the thyratron which is subsequently fired by the output of a 2-gate such as PSG1 operated as a result of the combined marking potentials from Sel.1 and Sel.2. When the thyratron fires a signal is transmitted to a 2-gate such as PCG5 associated with the thyratron so that a pulse train from, for example, PCG4 passes through the 2-gate to lead PDL1. Release of the selecting means Sel.1 and Sel.2 does not of course affect the thyratron which is only extinguished on the re-application of the inhibition from PLM1.

The connection is held so long as a hold signal is present on either the calling or called circuit causing the pulse train of the calling circuit to be present on either of the common leads. When both holds are removed release of the connection takes place by replacing the inhibition on the memory devices associated with the pulse train of the calling circuits.

It will be clear to those skilled in the art that there are many other ways of carrying the invention into effect and that there are many alternative circuit techniques for converting the embodiments herein described and also many other embodiments of the invention into practice.

Although in the embodiments of the invention described above with reference to Figures 5 and 6 the circuits are modulators connecting a speech circuit to the common transmission highway of a time division multiplex system it would be appreciated that the circuits may also be modulators or gates interconnecting the common highways to time division multiplex systems. To place a channel in one highway in communication with a channel in another highway it is necessary to make effective in the modulator interconnecting the highways a pulse train coincident with the channel pulse trains. Thus, if several channels are to be placed in communication, several pulse trains will have to be made effective in the modulator. The use of such modulators or gates is described in the specification of co-pending patent application Ser. No. 391,020, filed on November 9, 1953, in the name of Lionel Roy Frank Harris.

I claim:

1. A system for distributing pulse trains comprising in combination a plurality of pulse coincidence gates, a plurality of pulse storage devices, electric leads connecting each of said coincidence gates to a different combination of said pulse storage devices, a pulse gate for each storage device whose output is connected to said storage device, pulse storage device marking means, marking leads connecting said marking means to said pulse gates for applying marking electric stimuli to the pulse gates of selected combinations of storage devices, and pulse train indicating means connected to said pulse gates for applying to the marked pulse gates a pulse of the pulse train to be stored by the pulse train storage devices connected to the marked pulse gates.

2. A system for distributing pulse trains comprising in combination a plurality of pulse coincidence gates, a number of static memory devices arranged in groups, electric leads connecting each memory device in a group to one of said coincidence gates, a plurality of pulse train generators each of which is connected with one static memory device in each group, first static memory device marking means, marking leads connecting said marking means to said memory devices for marking each memory device connected to a pulse coincidence gate which is selected to produce an output and second static memory device marking means connected to said memory devices for marking in each group those memory devices to which are connected the pulse train generators producing the pulse train to be applied to the selected coincidence gate.

3. A switching system comprising in combination a plurality of input circuits, a plurality of output circuits and a modulator for each input circuit and for each output circuit, a common highway interconnecting the modulators of the input and output circuits, a plurality of pulse storage devices, electric leads connecting each output modulator with a different combination of storage devices, a number of pulse train sources each of which is joined to a different input circuit modulator, output circuit selecting means connected to said output circuits and to said storage devices for selecting a free output circuit and applying a marking electric stimulus to the storage devices of that combination of storage devices connected to the modulator of the free output circuit, and input circuit selecting means connected to said input circuit modulators and to said storage devices for selecting an input circuit requiring connection to an output circuit and applying a pulse of the pulse train connected to the modulator of the selected input circuit to the marked pulse storage devices and means for releasing said selecting means.

4. A switching system comprising in combination a plurality of input circuits and a plurality of output circuits, a modulator for each input and for each output circuit, a number of pulse sources each of which is connected to a different input circuit modulator, a plurality of groups of static memory devices each group containing a number of such devices, and for each static memory device a pulse coincidence gate whose output is applied to the device and a pulse gate to which the output from the static memory device is applied, connections between each pulse source and one pulse gate in each group of static memory devices, input circuit selecting means connected to said input circuits and to said coincidence gates for selecting an input circuit and applying a marking electric stimulus to the coincidence gates of those static memory devices whose pulse gates have connected to them the pulse source connected to the selected input circuit, output circuit selecting means for selecting a free output circuit, marking leads connecting said output circuit selecting means to said coincidence gates whereby there is applied an electric stimulus to the marked coincidence gates and means for releasing said selecting means.

5. A switching system comprising a plurality of incoming circuits and a plurality of outgoing circuits, a modulator for each incoming circuit and for each outgoing circuit, a common highway interconnecting said modulators, a plurality of pulse train generators, leads interconnecting each of said outgoing circuit modulators with a different combination of pulse train generators, means for applying to an incoming circuit modulator the pulse train to be used in a connection between this circuit and a free outgoing circuit, incoming circuit selecting means connected to said incoming circuit modulator, means for applying to said incoming circuit selecting means the pulse trains of incoming circuits requiring connections to free outgoing circuits, outgoing circuit selecting means connected between said outgoing circuits and said pulse train generators for selecting a free outgoing circuit and applying a marking stimulus to that combination of pulse train generators connected to the modulator of the selected outgoing circuit, means for applying the output of said incoming circuit selecting means to the marked combination of pulse train generators, and means for releasing said selecting means.

6. A system for distributing pulses comprising in combination a group of pulse generators each connected to an electric lead individual to the generator, a plurality of coincidence gates each connected to a combination of said electric leads, said combinations being individual to the coincidence gates, pulse generator marking means, marking leads connecting said marking means to said coincidence gates for applying an electric marking signal to each pulse generator whose electric lead is comprised in the combination of electric leads individual to a coincidence gate from which an output is required and means for indicating to the marked generators the pulses required to be produced by the marked generators to cause the coincidence gate to produce an output.

7. A system for distributing pulse trains comprising a plurality of coincidence gates, a group of pulse train generators, electric leads connecting each of said coincidence gates to a combination of said pulse train generators, pulse generator marking means connected to all said pulse train generators for marking each generator of a specified combination and pulse train indicating means also connected to said pulse train generators for indicating to each marked generator the pulse train to be generated thereby.

8. A system for distributing pulse trains comprising a plurality of coincidence gates each responsive only to a characteristic combination of pulse trains, a group of pulse train generators, electric leads connecting each of said coincidence gates to each of said pulse train generators, pulse generator marking means connected to said pulse train generators for marking those required to produce the pulse trains of a specified combination and pulse train indicating means connected to said pulse train generators for indicating to each marked generator the pulse train to be produced thereby.

References Cited in the file of this patent

UNITED STATES PATENTS

| | | |
|---|---|---|
| 2,490,833 | Ransom | Dec. 13, 1949 |
| 2,549,422 | Carbrey | Apr. 17, 1951 |
| 2,577,141 | Mauchley et al. | Dec. 4, 1951 |
| 2,666,809 | Flowers | Jan. 19, 1954 |
| 2,686,839 | Den Hertog | Aug. 17, 1954 |
| 2,695,333 | Harper | Nov. 23, 1954 |
| 2,727,094 | Flowers et al. | Dec. 13, 1955 |
| 2,773,934 | Trousdale et al. | Dec. 11, 1956 |